United States Patent [19]

Gross et al.

[11] 4,340,562
[45] Jul. 20, 1982

[54] PROCESS FOR PRODUCING A MOLDED ARTICLE

[75] Inventors: Laurence H. Gross, Bridgewater; Marvin E. Sauers, Belle Mead, both of N.J.

[73] Assignee: Union Carbide Corporation, Danbury, Conn.

[21] Appl. No.: 235,462

[22] Filed: Feb. 18, 1981

Related U.S. Application Data

[63] Continuation-in-part of Ser. No. 113,345, Jan. 18, 1980, abandoned.

[51] Int. Cl.³ .............................................. B29G 3/00
[52] U.S. Cl. .............................. 264/328.2; 264/328.6; 264/328.16; 264/328.18
[58] Field of Search ............... 264/328.2, 328.5, 328.4, 264/328.6, 328.18, 328.16

[56] References Cited

U.S. PATENT DOCUMENTS

| | | | |
|---|---|---|---|
| 2,847,712 | 8/1958 | Pollord | 264/328.4 X |
| 3,787,159 | 1/1974 | Bielfeldt | 425/543 X |
| 3,789,103 | 1/1974 | Sueyoshi | 264/328.18 X |

FOREIGN PATENT DOCUMENTS

| | | | |
|---|---|---|---|
| 2166208 | 8/1973 | Fed. Rep. of Germany | 264/328.6 |
| 2296514 | 12/1974 | France . | |

*Primary Examiner*—Thomas P. Pavelko
*Attorney, Agent, or Firm*—Donald Papuga

[57] ABSTRACT

This invention concerns a process for fabricating fiber reinforced thermoset resin articles. The process comprises the steps of (a) providing in a distributing zone, an intimate mixture of one or more fibers with a melting point or a glass transition temperature above about 130° C. and a fiber length greater than about 0.5 centimeters, and a liquid resin, said resin having a viscosity of less than about 3000 centipoise at 25° C., (b) injecting said mixture into the cavity of a closed matched metal die mold, thereby filling said cavity with said mixture, (c) heating said mixture so as to cause an exothermic reaction to occur in said mold, and (d) opening said mold and recovering a thermoset fiber reinforced molded article therefrom.

14 Claims, 7 Drawing Figures

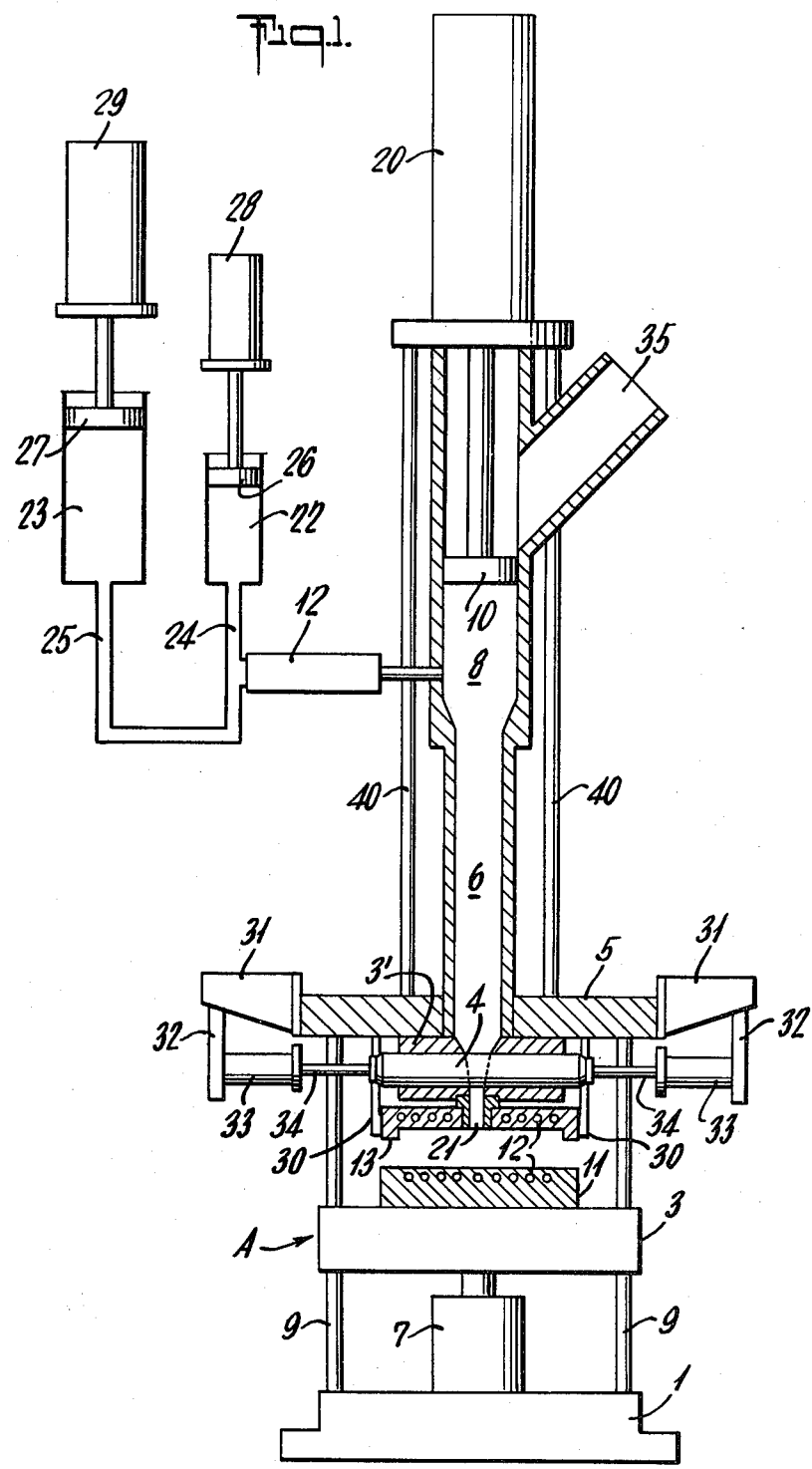

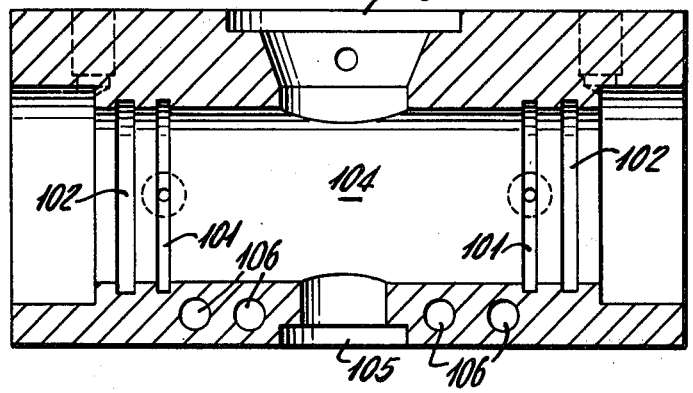
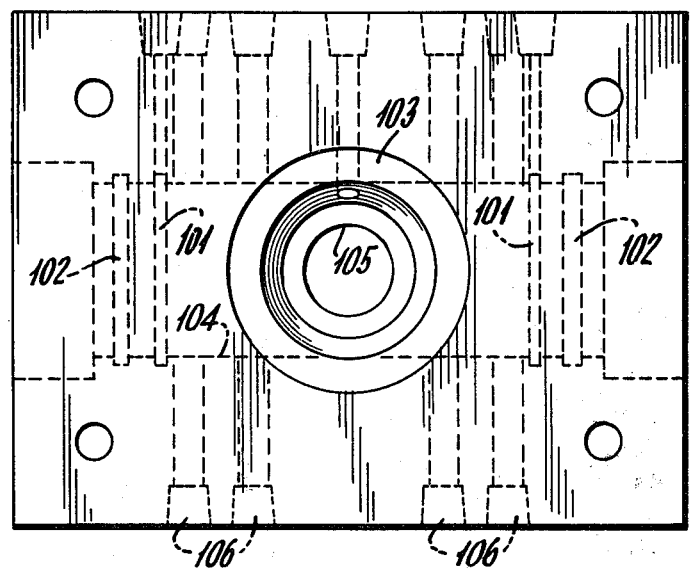
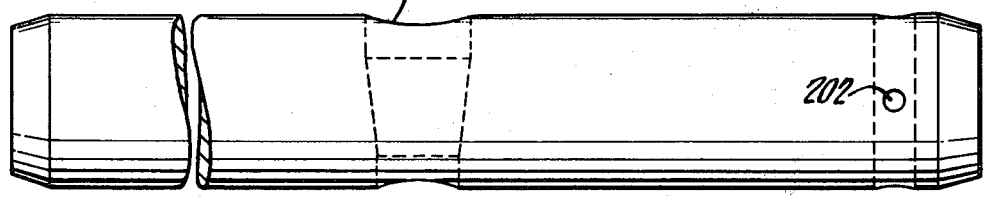

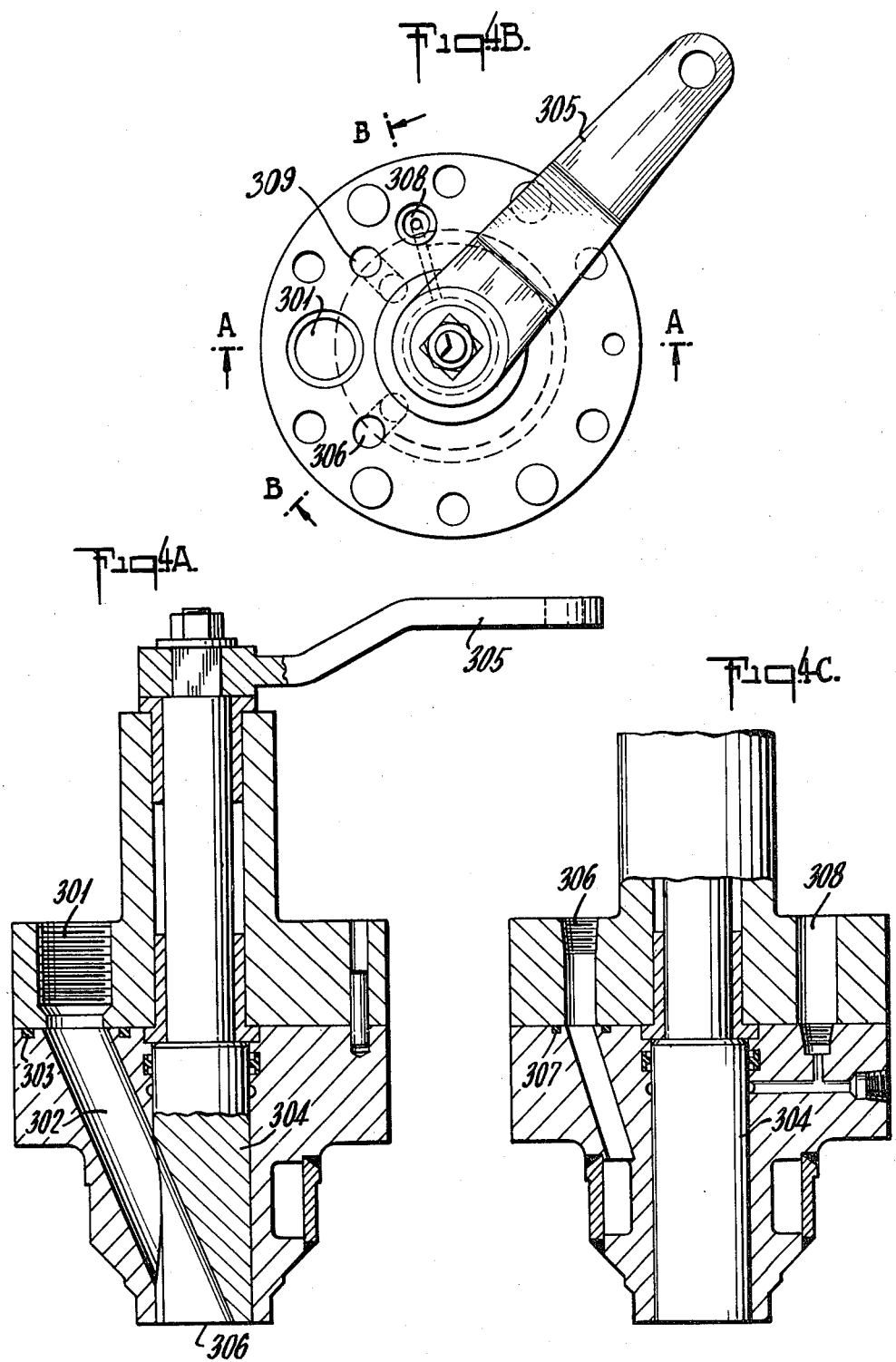

PROCESS FOR PRODUCING A MOLDED ARTICLE

This application is a continuation-in-part application of Ser. No. 113,345, filed Jan. 18, 1980 now abandoned.

This invention relates to a process for the fabrication of fiber reinforced thermoset resin articles suitable for uses for which the usual fiber reinforced thermoset resin articles are employed. In particular, this invention relates to making a fiber reinforced thermoset resin article in which the fiber reinforcement comprises one or more fibers with a melting point or a glass transition temperature above about 130° C., and a fiber length greater than about 0.5 centimeter. The process of this invention injects a mixture of a mass of fibers with a melting point or a glass transition temperature above about 130° C., and a fiber length greater than about 0.5 centimeters, and a liquid resin having a viscosity of less than about 3000 centipoise at 25° C. into a heatable matched metal die mold. The fiber reinforced thermosettable resin articles produced are particularly desirable for their high strength. The prime use for them is in the making of automotive parts.

FRP, i.e., fiber reinforced plastic and resin articles, are widely used by the automotive and other industries in products which meet aesthetic requirements and/or can withstand severe property and usage requirements. This invention is concerned with such types of articles.

Fiberglass has been widely used as a reinforcement in the manufacture of thermoset molded articles. These types of articles have been termed "Glass Reinforced Plastics" (GRP) and "Glass Fiber Reinforced Plastics" (GFR). The fiberglass content in these thermoset molded articles ranges from about 15 to about 75-80 weight percent. Unsaturated polyester resins are used primarily as the resin component in these glass reinforced thermoset plastics.

These unsaturated polyester resins have been employed in the manufacture of a variety of glass reinforced products by different types of processes. The processes of forming glass reinforced products are generally in two categories, i.e., wet lay up and thickened processes. Wet lay up processes include the following: pre-impregnation of a fibrous mass with resin, followed by compression molding; spray-up molding in which cut fiber and resin are sprayed jointly onto a mold form; preform molding in which liquid resin is poured onto a mat while the mat is disposed in a compression mold.

In thickened processes, polyester resin reacts with an inorganic alkaline earth metal oxide or hydroxide such as, magnesium oxide and calcium hydroxide, to increase the viscosity of the fiber containing resin so that it has a non-liquid paste-like quality. The resin can then be handled and deposited within the framework of a mold to achieve a more uniform and more convenient molding. Thus, sheet molding compounds (SMC) are formed by depositing a layer of cut fiberglass fibers between layers of resin on a polyethylene film. The composition contains polyethylene film on the outside surfaces. It is fed through nip rollers which blends the polyester resin uniformly within the fibrous mat to form a sheet. The sheet is allowed to stand so that reaction occurs between the carboxy groups of the polyester resin and the alkaline earth metal oxide filler. The resin increases in viscosity. The sheet can then be easily handled in the molding procedure.

Bulk molding compounds (BMC) may be produced by an injection molding process. Alkaline earth metal oxides and/or hydroxides are added to the bulk molding composition in an amount sufficient to thicken the composition to a desired viscosity so that it can be readily handled. Inorganic particulate fillers such as calcium carbonate, clay or mica flakes are always required with BMC. Typically, the fiber length of the fiber reinforcement is 0.5 centimeters or less. The resin and filler are generally premixed before mixing with the fibers. The thickened bulk molding compounds are then employed in transfer and injection moldings.

Thickened bulk molding compounds, however, have not been widely used in injection molding since their viscosities are normally higher than is desirable for effective molding, and the equipment required to mold the high viscosity thickened bulk molding compound is extremely expensive, large, and cumbersome to operate. A further disadvantage in using thickened bulk molding compounds in an injection molding process is that the fibers must be of very short length in order to effectively distribute the fiber throughout the mold. The use of short fibers results in molded articles which do not have optimum performance characteristics particularly, strength properties.

Recently, a series of glass fiber reinforced polyester compositions have been developed which utilize the thickening characteristics of SMC, BMC, and the like, but which contain extremely high concentrations of glass fiber. For example, a series of polyester compositions containing from about 50 to about 75 weight percent of glass fibers have been developed. These materials can be used in making molded products, but typically, they do not possess the desirable surface characteristics which provides a "Class A" product. However, their strength characteristics, which is supplied by the high concentration of glass fibers, provides unique markets for these glass fiber reinforced polyester resins. The fibers in these reinforced resins are either unidirectionally aligned, as from continuous filament tow, or are randomly distributed in long fibers in a polyester mat, or from a combination thereof, to supply enhanced multidirectional strength to the molded article. The high glass fiber containing polyester resins are sheet molding compounds, XMC, HMC (XMC and HMC are trademarks of PPG Industries, Inc.) and SMC-R-Fiber content such as 50–65, (trademarks of Owens Corning Fiberglass Corp.). These high glass fiber content resin systems are molded only by compression molding procedures.

THE INVENTION

This invention is directed to a process for rapidly fabricating fiber reinforced thermoset resin articles containing high fiber content by injection molding procedures.

In the present process inorganic fillers are not required as with BMC. Also, fiber attrition does not occur as it does with BMC. Further, in the process of the present invention the fiber and liquid resin may be brought together in the process/apparatus as compared to BMC wherein resin and filler are premixed before mixing with the fibers.

Also, as compared to SMC, the process of the present invention has advantages, i.e., there is no need to wait several days to reach acceptable molding viscosity (7 to 50 million centipoise) since much lower viscosities may be utilized herein.

Additionally, the thermoset resin molded articles produced by the process of this invention have better performance properties than injection molded BMC and comparable performace properties to SMC.

In the present process, as the first step, an intimate mixture of one or more fibers with a melting point or a glass transition temperature above about 130° C., having a fiber length greater than about 0.5 centimeters, and a liquid resin having a viscosity of less than about 3000 centipoise at 25° C. are provided in a distributing or accumulating zone. This mixture is then injected into the cavity of a closed heated matched metal die mold to fill the cavity of the mold. The mixture is then heated to cause an exothermic reaction to occur in the mold. The mold is then opened and a thermoset molded article is recovered from the mold. Curing the article in the mold is achieved typically within less than about 5 minutes.

It is necessary to employ a sturdy mold, such as one made of metal which possesses the heating capacity required for the process of this invention. A desirable mold for use in this invention is a heatable matched metal die mold.

The fibers which are suitable for use in this invention include glass fibers, carbon fibers, aromatic polyamide fibers (such as aramid fibers sold by E. I. DuPont Nemours, Wilmington, Delaware under the trademark of Kevlar), metal fibers, such as aluminium and steel fibers, boron fibers and the like.

The carbon fibers include those having a high Young's modulus of elasticity and high tensile strength. These carbon fibers may be produced from "graphitizable" materials such as is described in U.S. Pat. No. 4,005,183.

The preferred fibers are fiberglass, carbon fibers and aromatic polyamide fibers. These fibers may contain binders, which are well known in the art.

The amount of fibers supplied to the distributing zone should be sufficient to provide from about 15 to about 70 weight percent, preferably from about 40 to about 60 weight percent, of the weight of the molded article. The fibers have lengths of from greater than about 0.5 to about 5 centimeters. Preferably, the fiber length is greater than about 1.00 centimeter.

The fibers may be added to the distributing or accumulating zone in any manner, including spraying the fibers into said zone. All of the fibers may be added to the distributing zone or a portion thereof. This portion of fibers is compressed, more fibers added, and the mass compressed. This procedure is repeated until the desired amount of fibers is added. Additionally, the fibers may be compressed prior to their addition to the distributing zone.

The liquid resin may be added to the fibers in the distributing zone in any manner. However, the resin and fibers should be contacted so that the fibers are completely penetrated by the resin.

The liquid resin may be added to the complete mass of fibers in the distributing zone. Alternatively, a portion of said resin may be added to a portion of the fibers, the mass compressed, more fibers and resin added, the mass compressed and this procedure repeated until the desired amounts of glass and fibers are achieved. Additionally, the fibers and liquid resin may be sprayed into the distributing zone simultaneously or in an alternating sequence. Pre-compressed fibers may also be contacted with the liquid resin followed by addition of such fibers and resin to the distributing zone wherein such mixture is compressed. This procedure distributes the resin within the total fibrous mass. More resin may then be added to the fiber-resin mixture in the distributing zone. The fiber-resin mixture is compressed under sufficient pressure generally greater than about 400 psi so as to cause intimate contact between fibers and resin. In such a procedure air is vented from the distributing zone.

In order to achieve better wetting of the fibers, the height to width ratio of the volume of the distributing zone should have a value of less than 1, and preferably less than about 0.6.

The distributing zone is generally at a temperature of about 25° C. so that the resin does not crosslink until the materials are introduced into the heated matched metal die mold.

During loading and prior to injection, the contents in the distributing zone are under a pressure of from about 500 to about 2000 psi, and preferably about 1000 psi.

The liquid resins which are used in this invention have a viscosity of less than about 3000, and preferably less than about 200 centipoise at 25° C. These liquid resins include any thermally initiated therosetting resin which advances from a low viscosity fluid to a rigid cured product. These resins include polyesters, vinyl esters, epoxy resins, hybrid epoxy-polyesters and lactam resins as well as the resins discussed, infra.

Additionally, these resins can optionally possess the ability to be increased in viscosity in the distributing zone to decrease any tendency for fiber segregation during mold filling. The liquid resins increase in viscosity by two mechanisms, i.e., by ionic bond formation or by covalent bond formation. In ionic bond formation the carboxyl groups in the resin react with an alkali metal oxide or hydroxide which causes thickening or viscosity increase to occur. In covalent bond formation thickening results from linear extension of difunctional reactants such as, for example, the formation of a polyurethane via reaction of an isocyanate with a diol.

The liquid resins which increase in viscosity by ionic bond formation include conventional polyesters with carboxylic acid groups which can react with conventional thickening agents such as alkali metal oxides or hydroxides.

Generally, the polyester resins are prepared from one or more of an ethylenically unsaturated carboxylic acid or its anhydrides, and a dihydric or polyhydric alcohol. The preferred unsaturated acids and anhydrides include maleic anhydride, fumaric acid, o-phthalic anhydride, isophthalic acid, and the like. Preferred dihydric alcohols include ethylene glycol, propylene glycol, diethylene glycol, neopentyl glycol, dipropylene glycol, and the like.

Additionally, other resins which can react with thickening agents are described in the following U.S. Patent Applications:

(A) U.S. patent application Ser. No. 034,995 filed May 1, 1979, now abandoned, entitled "Maleate Esters of Organic Polyols and A Process For Their Production" and filed by H. Gardner et al. describes a composition comprising a homogeneous liquid mixture of (a) a half ester of an organic polyol characterized by the following empirical formula

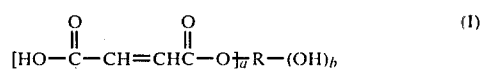

wherein a is a number having an average value of about 1.8 to less than about 4, b is equal to the free valence of R less the average value of a, R is the hydroxyl-free residue of an organic polyol which contained from 2 to 4, inclusive, hydroxyl groups of OH in the formula (I),
(b) maleic anhydride,
(c) an ethylenically unsaturated monomer which forms a liquid homogeneous mixture and is copolymerizable with (a) and (b), and
(d) a basic compound.

The composition additionally contains a free radical curing agent.

Compositions excluding the basic compound are also included herein.

(B) U.S. patent application Ser. No. 034,996, filed May 1, 1979 now U.S. Pat. No. 4,229,559, entitled "Novel Bis(Half Ester) and Compositions Containing the Same" and filed by R. J. Cotter et al, describe composition comprising:

a half ester characterized by the following empirical formula:

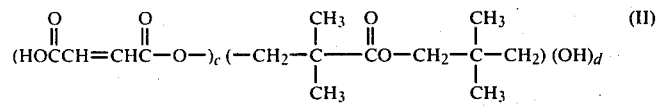

wherein c is a number having an average value between 1.7 and 2, and d is equal to 2−c. Also described is a composition comprising said half ester, maleic anhydride and an ethylenically unsaturated monomer, wherein at least 75 mole percent of the half ester is in the maleate form. The composition additionally contains a free radical curing agent.

(C) U.S. patent application Ser. No. 034,997, filed May 1, 1979, now abandoned, entitled "Polyester Resin Composition" and filed by H. Gardner, describes a composition comprising a mixture of (a) a polyester of the following formula:

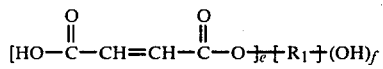

wherein e has an average value between 1.5 and 2, f is 2-e, $R_1$ is the residue of a predominantly hydroxyl terminated polyester having a molecular weight not exceeding about 1500 and obtained by the condensation of a diol selected from the class consisting of 1,2-propylene glycol, 1,3-butanediol, 2,2-dimethyl-1,3-propanediol, dipropylene glycol, diethylene glycol, 2,2-dimethyl-3-hydroxypropyl 2,2-dimethyl-3-hydroxypropionate and mixtures thereof and mixtures of ethylene glycol and said diols, with a dicarboxylic acid or anhydride selected from the class consisting of maleic acid and anhydride, fumaric acid, orthophthalic acid and anhydride, isophthalic acid, terephthalic acid, carbic acid and anhydride, and mixtures thereof, (b) maleic anhydride, and (c) an ethylenically unsaturated monomer which forms a homogeneous mixture with and is copolymerizable with (a) and (b).

The disclosures of these copending U.S. Patent Applications (A) to (C) are incorporated herein by reference.

The liquid resins which increase in viscosity by covalent bond formation wherein a difunctional material reacts with a polyisocyanate, preferably a diisocyanate, include the following:

(I) an unsaturated polyester resin, a polyol, and an ethylenically unsaturated monomer; (II) an unsaturated polyol and an ethylenically unsaturated monomer; (III) an unsaturated hydroxy terminated polyester oligomer and an ethylenically unsaturated monomer; (IV) a polyol, a polyacrylate, optionally containing hydroxyl groups, and an ethylenically unsaturated monomer.

In the above, the preferred polyols contain only two hydroxyl groups. In (IV), the polyacrylate preferably contains two hydroxyl groups.

A preferred polyester diol reactive with isocyanates is found in the following:

(D) U.S. patent application Ser. No. 076,625, filed Sept. 18, 1979 now U.S. Pat. No. 4,241,199 entitled "Novel Polyester Diols," and filed by R. A. Dunleavy. This application describes that the polyester diol contains aliphatically unsaturated divalent diacyl moieties of the formula (II)

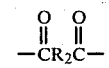

wherein $R_2$ is a single bond connecting the two carbonyl groups or a divalent organic groups free of aliphatic unsaturation, preferably an olefinically saturated hydrocarbon group, and olefinically unsaturated divalent diacyl moieties of the formula

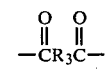

in which $R_3$ is a divalent olefinically unsaturated organic group, preferably a divalent olefinically unsaturated hydrocarbon group. The above-mentioned diacyl moieties are present in a mole ratio of 0.25 to 3 moles, preferably 0.5 to 2 moles, of said diacyl moieties free of aliphatic unsaturation for each mole of said olefinically unsaturated diacyl moieties. The olefinically saturated diacyl moieties can be the same or different, i.e., R can be the same or different and the olefinically unsaturated diacyl moieties can be the same or different, i.e., R' can be the same or different, within the polyester diol composition.

The other component of the polyester diol, namely, the dioxy moieties include divalent branched dioxy moieties and divalent linear dioxy moieties. The divalent branched dioxy moieties are represented by the formula

in which $R_4$ is a divalent branched chain composed of carbon and hydrogen or carbon, hydrogen and oxygen and contains 2 to 8 consecutive atoms of carbon or carbon and oxygen interconnecting the oxy groups of said moiety as shown in the formula. $R_4$ is formed with branches which are alkyl groups of 1 to 8 carbon atoms bonded to one or more carbon atoms of the consecutive atoms interconnecting the oxy groups. In addition, the polyester diol contains divalent linear dioxy moieties which are represented by the formula

—OR$_5$O— in which R$_5$ is a linear chain composed of carbon and hydrogen or carbon, hydrogen and oxygen and contains 2 to 8 consecutive atoms of carbon or carbon and oxygen interconnecting the oxy groups of the linear dioxy moieties as shown in the formulas therefor. The dioxy moieties in the polyester diol are present in a mole ratio of 0.3 to 3 moles, of the branched dioxy moieties per mole of linear dioxy moieties. The above-mentioned diacyl moieties are bonded through ester linkages to said dioxy moieties in a mole ratio of at least 1.75 moles, preferably, about 2 moles, of the total dioxy moieties per mole of the total of diacyl moieties. The polyester diol is end-blocked essentially only by alcoholic hydroxyl groups bonded to dioxy moieties. The novel polyester diols have an acid number of less than 3, preferably less than 1, and most preferably less than 0.5. R$_4$ and R$_5$, respectively, can be the same or different with the polyester diol composition.

Another preferred resin system utilizing a polyisocyanate is described in the following:

(E) U.S. patent application Ser. No. (107,084) entitled "Curable Resin Compositions" filed by E. N. Peters on Dec. 28, 1979 and now U.S. Pat. No. 4,289,682.

The curable resin composition as described in said application comprises a homogeneous mixture of a hydroxy-terminated unsaturated polyester oligomer, polyisocyanate, an ethylenically unsaturated monomer and a catalyst capable of catalyzing polyurethane forming reactions of polyisocyanate and the hydroxy-terminated polyester oligomer.

The hydroxy-terminated unsaturated polyester oligomers are prepared by forming an alkoxylated derivative of a diol and then reacting the alkoxylated diol with maleic anhydride, fumaric acid or fumaryl chloride under conventional methods.

The disclosures of Patent Applications (D) and (E) are incorporated herein by reference.

Another resin composition suitable for use in this invention contains an expoxide, an ethylenically unsaturated monomer and a polyester, a bis(maleate) or a polyacrylate.

A preferred resin system is described in the following:

(F) U.S. patent application Ser. No. 070,007, filed Aug. 27, 1979, now abandoned, by H. Gardner and entitled "A Composition Containing a Half Ester of an Organic Polyol, An Unsaturated Monomer and an Expoxide". This application describes a polymerizable liquid mixture of (a) a half ester charcterized by the following empirical formula:

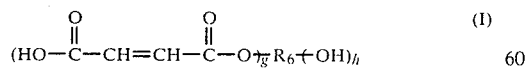

wherein g is a number having an average value of about 1.5 to less than about 4, h is equal to the free valence of R$_6$ less the average value of g, R$_6$ is the hydroxyl-free residue of an organic polyol which contained from 2 to 4, inclusive, hydroxyl groups, OH, in formula (I) and no more than one internal ester group, (b) maleic anhydride, (c) an epoxide containing two or more 1,2-epoxide radicals, and (d) an ethylenically unsaturated monomer which forms a liquid homogeneous mixture with the half ester, maleic anhydride and epoxide.

The disclosures of Patent Application (F) is incorporated herein by reference.

The resin formulations include an azo or peroxide type curing agent which initiates polymerization when the resing/glass mixtures contact the heated mold. These azo and peroxide curing agents are such as those which are described by Gallagher, et al. "Organic Peroxides Review", Plastics Design & Processing, July, 1978, pages 38–42, and August, 1978, pages 60–67, inclusive. The technology disclosed in those two articles is incorporated herein by reference. The choice of the specific peroxide or azo initiators for the purpose of curing the liquid resins utilized in this invention is within the purview of those having skill in this art and the manner in which such peroxides and azo initiators operate to effect a desirable cure is generally characterized in the aforementioned articles.

Illustrative of a few such curing agents are 2,2'-azobis-isobutyronitrile, dibenzoyl peroxide, lauroyl peroxide, di-t-butyl peroxide, diisopropyl peroxide carbonate, t-butyl peroxy-2-ethylhexanoate, t-butylperpivalate, 2,5-dimethyl-hexane-2,5-di-per-2-ethyl hexoate, t-butylperoctate, t-butylperneodecanoate, t-butylperbenzoate, t-butylpercrotonate, t-butyl perisobutyrate, di-t-butyl perphthalate, and the like.

The concentration of the curing agent is not critical and can be varied within wide limits. As a representative range, the concentration can vary from about 0.1 to about 5 wt. percent based on the total weight of resin.

The liquid resin compositions also include polymerization inhibitors (e.g. about 200 parts per million of hydroquinone) to prevent premature curing of the resin/glass mixture prior to injection.

The viscosity of the fiber-resin mixture should be sufficient to prevent separation during its injection into the mold. If the viscosity of the mixture is insufficient to overcome the shear forces of separation, then the resin may be maturated, as described supra, to increase the viscosity of the resin in the fiber-resin mixture to overcome such shear forces. Additionally, and preferably, the resin may be partially polymerized in the distributing zone to increase the viscosity of the resin.

In order to facilitate the understanding of the aforementioned process, reference is made to the Figures herein which characterize specific embodiments of the process. It is not intended that the scope of the process as hereinabove defined be restricted by the specific materials and equipment which are characterized in the Figures since they are intended for illustration purposes only.

FIG. 1 is an elevated view with partial cross-sections of a molding apparatus containing accumulators and a mold for effecting the process of this invention.

FIG. 2 is a side and top view of a shuttle valve body.

FIG. 3 is a side view of a shuttle valve shuttle.

FIG. 4 is an end and top view of an injection valve assembly.

FIG. 1, depicts a side view of a platen press A. The press comprises a base 1 upon which the remainder of the structure of the apparatus is positioned. The press comprises platens 3 and 5 having the capability of being closed to one another by a hydraulic cylinder 7 which moves platen 3 into closure position relative to platen 5.

Platen 5 is a fixed platen. Between platens 3 and 5 are female die 13 and male die 11. Each of die 13 and 11 contain a plurality of cartridge heaters 12 which heat the mold when the dies are closed. Alternate methods of heating may be used, such as steam. Columns 9 (four are affixed on base 1) support platen 5 and guide the path of moveable platen 3. Support members 30 hold mold member 13 to platen 5. Situated in a hole disposed centrally of fixed platen 5 is injection nozzle 21. Injection nozzle 21 passes through shuttle valve housing 3' and shuttle valve body 4. Maturation zone 6, which is a wide diameter pipe, passes through platen 5 and meets injection nozzle 21. In accumulator 8 the fibers and resin components are mixed. One embodiment of this invention includes a valve, such as a shuttle valve similar to that shown in FIGS. 2 and 3 which can be used to separate zones 6 and 8.

Through inlet 35 fibers are fed into accumulator 8. Piston 10 forces materials from accumulator 8 into the maturating zone 6. The piston is controlled by raising and lowering hydraulic cylinder 20. Supports 40 hold cylinder 20.

The resin components are fed into accumulator 8 from accumulators 22 and 23 by passing through pipes 24 and 25, respectively, and mixer 12, which is an optional embodiment. Pistons 26 and 27 forces the materials from accumulators 22 and 23 respectively. These pistons are controlled by raising and lowering hydraulic cylinder 28 and 29, respectively;

Supports 31 and 32 support hydraulic cylinders 33. These hydraulic cylinders cause pistons 34 to move shuttle valve 4 back and forth in a horizontal plane.

Fibers are fed through inlet 35 into accumulator 8. The fibers can be compacted in zone 8 by operating piston 10. The resin components are supplied from accumulators 22 and 23 to zone 8 through pipes 24 or 25. A mixer 12 may be provided in order to mix the materials prior to supplying them into accumulator 8. The accumulators may be open cups into which the resin components is supplied. In another embodiment of the invention, a continuous feed may be supplied to accumulators 22 and 23 from sources outside of the accumulator, such as, a mixing tank which contains a feed pump or a compression pump. Located above accumulators 22 and 23 are pistons 26 and 27, driven by hydraulic cylinders 28 and 29, respectively.

The apparatus depicted in FIG. 1 is operated as follows: fibers are fed through port 35 into accumulator 8. Resinous components are transferred into accumulator cups 22 and 23 to provide a charge suitable to be combined with the fibers and fill the mold.

Heaters 21 in the mold are activated to provide a temperature of, for example 110° C. and the mold is closed.

The resin components are transported by lowering pistons 26 and 27 into accumulators 22 and 23 with pressure which drives resinous material from the accumulators through pipes 24 and 25 and into zone 8 where it mixes with the fibers. In a variation of this procedure, a portion of the fibers can be added to accumulator 8, then a portion of the resin components is added thereto. This procedure can be repeated until all of the fibers and resin needed to fill the mold have been added to the accumulator 8. The resin and fiber mixture is transported into pipe 6 by lowering piston 10 with pressure which drives the material into pipe 6, where viscosity builds up. The shuttle in shuttle valve body 4 is activated by allowing pistons 34, under pressure, to drive the shuttle valve back and forth in a horizontal plane. The shuttle valve allows the fiber-glass mixture to pass from pipe 6 into nozzle 21 and then into the mold. The shuttle valve controls the flow into the nozzle and into the mold.

After molding is complete in about 2 to 5 minutes, the mold is opened and the product is withdrawn. The mold is opened after the resinous material therein is in a thermoset condition. In some instances, due to mold design, it is necessary to mechanically finish the molded article. Proper design of the mold should minimize any mechanical treatment such as sanding, grinding, etc. that might be needed to provide a finished molded product.

FIG. 2 describes a side and top view of shuttle valve body 4 in FIG. 1. FIG. 2A is a side view of the shuttle valve body. In operation, it contains the shuttle of FIG. 3. The valve body contains opening 103 to receive the fiber-resin mixture from pipe 6 and opening 105 to pass the material into the nozzle 21. 102 are grooves for o-rings to insure the flow of the lubricant towards the center of the valve body. If hole 201 of FIG. 3 lines up with 105 of FIG. 2A, the shuttle is in a position to permit material to pass through it from pipe 6 and into the nozzle. Cavity 101 allows a lubricant to be pumped into it for shuttle lubrication. The lubricant is typically styrene.

FIG. 2B is a top view of the shuttle body depicting inlet opening 103 and cooling lines 104.

FIG. 3 depicts a side view of the shuttle valve shuttle which rides in the shuttle valve body. The shuttle contains opening 201 which receives the fiber-resin mixture. At one end is opening 202 which locks a pin in place to prevent rotation of the shuttle.

FIG. 4 depicts an injection valve assembly which can be used instead of the shuttle valve assembly 4 in FIG. 1.

FIG. 4A is a side view of section A—A of FIG. 4B. The resin glass mixture enters at opening 301 and exits at 306 of the valve. O-rings 303 provides a seal. 304 has an opening which can be used to interface with opening 302 by turning handle 305 to permit the flow of the glass-resin mixture to flow into the mold.

FIG. 4B is a top view of the valve showing handle 305 and inlet 301 which receives the resin-glass mixture.

FIG. 4C is a cross sectional view along section B—B of FIG. 4B showing water inlet 306 and water outlet 309 (FIG. 4B) for cooling the valve assembly containing o-rings 307. Lubricant is added in 308 to provide lubrication for plug 304.

The following Examples serve to illustrate specific embodiments of this invention and it is not intended that the invention be limited by the Examples.

EXAMPLE 1

The equipment shown in FIG. 1 was used to prepare a mixture of polyester resin and fiberglass. With the piston in the full up position, one inch long chopped fiber-glass roving was introduced into the cylinder, i.e. distributing zone, in four stages. Each stage consisted of introducing 125 grams of chopped glass into the cylinder and hydraulically compressing it by bringing the piston down until 1500 psi pressure was attained. Thereafter, 500 grams of a commercial polyester resin, GR 14017, (a thermosetting polyester resin composition of a polyester oligomer derived from maleic anhydride and an iso/terephthalic mixture, diethylene glycol and propylene glycol, containing 50 percent styrene monomer, and manufactured by U.S. Steel Corporation, Linden, N.J.) and which includes a magnesium oxide thickening agent, with an initial viscosity of 150 centipoise, was pumped by a Hills-McKenna Positive Displacement Pump, into the bed of glass fibers. Pumping pressure was 1000 to 1200 psi. After the resin was introduced into the glass the mixture was extruded out of the cylinder without the mold in place. The quality of the glass-resin mixture, i.e., the uniformity of resin throughout the glass, was visually determined to be excellent. The glass bed was uniformly wet with the resin.

EXAMPLE 2

The procedure of Example 1 was repeated except that the mixture of resin and glass was allowed to maturate by the addition of magnesium oxide until the viscosity reached 11,000,000 centipoise.

The resin-glass was then placed in the distributing zone. The shuttle valve lubrication was turned on to allow a low flow rate of styrene between the shuttle and the shuttle valve body. Cooling water was flowing in the valve body. The hydraulic cylinders opening the shuttle valve were activated and the resin-glass mixture was hydraulically pushed at a pressure of 1750 psi into the mold cavity. The mold was at a temperature of 280° F. The mold cavity was in the shape of a ⅛ inch thick paddle. It was 13¾ inches long at the wide portion which extended for 10¾ inch. The narrow portion was 1½ inches wide. When the mold was full, the shuttle valve was returned to the closed position.

The force of the molding press was 30 tons.

After 3 minutes the mold was opened and the molded article removed. The molded part weighted 124 gram and contained 50 percent fiber-glass and had a flexural strength which averaged 16,900 psi and a flexural modulus of 1,100,000 psi, measured according to ASTM D-790.

EXAMPLE 3 TO 7

The procedures described in Examples 1 and 2 were exactly repeated except that the mixture of polyester resin and fiber-glass was allowed to maturate to different viscosities. 500 grams of the polyester resin GR 14017 (as described in Example 1) and 500 grams of fiber-glass were introduced into the accumulating zone as described in Example 1 and allowed to remain therein until the viscosity of the resin portion of the mixture, as shown in the Table, was attained. The viscosity was measured in a Brookfield HBT Viscometer equipped with T-A to T-F spindles.

The mixture was then added to the mold as described in Example 2 and a molded part, was produced.

The flexural strength and flexural modulus of the molded parts are as shown in the Table.

TABLE

| Example | Viscosity of the Resin at Time of Molding (Centipoise) | Flexural Strength (psi) | Flexural Modulus (psi) $\times 10^3$ |
|---|---|---|---|
| 3 | 160 | 11,350 TD[1] | 779 TD[1] |
|  |  | 32,450 MD | 1,270 MD |
| 4 | 120,000 | 14,500 TD | 770 TD |
|  |  | 20,700 MD | 1,065 MD |
| 5 | 524,000 | 19,200 TD | 749 TD |
|  |  | 31,400 MD | 1,150 MD |
| 6 | 6,000,000 | 18,500 TD | 831 TD |
|  |  | 33,700 MD | 1,354 MD |
| 7 | 13,400,000 | 22,600 TD | 917 TD |
|  |  | 41,900 MD | 1,750 MD |

[1] TD = transverse direction
MD = machine direction

EXAMPLE 8

This Example shows that low viscosity resins can be used to make parts with good mechanical properties.

A ⅛ inch part was molded having a Z configuration with the base of the Z being 10¾ inches long and 7⅛ inch high, and the extremities of the Z being 3⅜ inches long and 4⅛ inches high. Equal parts of a mixture of 1 inch chopped glass fibers and the following resin formulation: 900 grams of GR 14017 polyester resin, 3.0 grams of Zelec UN mold release (an organophosphate mold release sold by E. I. DuPont de Nemours, Wilmington, Del.) and 10 grams of t-butyl perbenzoate, were mixed by kneading the glass fibers and resin formulation together by hand.

The viscosity of the resin was 2500 centipoise at 23° C. The resin viscosity did not increase prior to molding since no thickening agent was added.

The mixture was injected into a mold at 280° F. A part having the Z configuration described, supra, was molded in 3.5 minutes.

Samples were taken from eight locations on the molded part and measured for flexural strength and flexural modulus. The average flexural strength of the samples was 42,700 psi and the average flexural modulus was 2,100,000 psi.

EXAMPLE 9

This Example shows that a maturated resin with a viscosity of 16,000 centipoise can be used to make parts with good mechanical properties.

The procedure of Example 8 to make a molded part in a Z configuration was repeated except that equal parts of a mixture of 1 inch chopped glass fibers and the following resin formulation was used:

696 grams of GR 14017 polyester resin,
279 grams of styrene,
2.9 grams of Zelec UN mold release,
9.8 grams of t-butyl perbenzoate,
9.8 grams of formamide, and
9.8 grams of magnesium oxide.

The resin had an initial viscosity of 160 centipoise at 25° C. The glass and resin were mixed by hand and allowed to stand for 3 hours. During this time the viscosity of the resin increased to 16,000 centipoise at 25° C.

The mixture was injected into a mold at 280° F. A part having the Z configuration described in Example 8 was molded in 3.5 minutes.

Samples were taken from eight locations on the molded part and measured for flexural strength and flexural modulus. The average flexural strength was 32,800 psi and the average flexural modulus was 1,550,000 psi.

What is claimed is:

1. A process for producing a fiber reinforced thermoset resin article which comprises the steps of (a) providing in a distributing zone, an intimate mixture of one or more fibers with a melting point or a glass transition temperature above about 130° C., having a fiber length greater than about 0.5 centimeters, and a liquid resin having a viscosity of less than about 3000 centipoise at 25° C., (b) injecting said mixture into the cavity of a closed matched metal die mold, thereby filling said cavity with said mixture; (c) heating said mixture so as to cause an exothermic reaction to occur in said mold, and (d) opening said mold and recovering a thermoset molded article therefrom.

2. The process of claim 1, wherein the amount of fibers supplied to the distributing zone is sufficient to provide from about 15 to about 70 weight percent of the weight of the molded article.

3. The process of claim 2, wherein the amount of fibers supplied to the distributing zone is sufficient to provide from about 40 to about 60 weight percent of the weight of the molded article.

4. The process of claim 1, wherein the fibers have lengths which range from greater than about 0.5 to about 5 centimeters.

5. The process of claim 4, wherein the fiber length is greater than about 1.00 centimeters.

6. The process of claim 1, 2, 3, 4, or 5 wherein the fiber is glass.

7. The process of claim 1, wherein the fiber and the resin are fed by air suspension into the distributing zone.

8. The process of claim 1 wherein the mixture in the distributing zone is maturated.

9. The process of claim 1 wherein the mixture of fibers and liquid resin in the distributing zone is subjected to sufficient pressure to cause intimate contact between them.

10. The process of claim 9, wherein air is vented from the distributing zone.

11. The process of claim 1, wherein the value of the height to width ratio of the volume of the distributing zone is less than about 1.

12. The process of claim 11, wherein said ratio is less than about 0.6.

13. The process of claim 1, wherein a pre-compressed mass of the fiber is contacted with the resin, the resin is allowed to penetrate the fiber mass and then the fiber mass containing the resin is compressed again, thereby further distributing resin within the mass.

14. The process of claim 13, wherein a portion of the fiber is pre-compressed and contacted with the resin, followed by addition of such fiber to the distributing zone.

* * * * *